(12) United States Patent
Malone

(10) Patent No.: US 7,055,869 B2
(45) Date of Patent: Jun. 6, 2006

(54) FALSE INSERTION PROTECTION TOP HAT FOR FLUID QUICK CONNECTORS

(75) Inventor: David S. Malone, Attica, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/765,284

(22) Filed: Jan. 27, 2004

(65) Prior Publication Data

US 2005/0161940 A1 Jul. 28, 2005

(51) Int. Cl.
*F16L 37/00* (2006.01)
(52) U.S. Cl. .................. 285/319; 285/93; 29/890.14
(58) Field of Classification Search ............ 285/93, 285/305, 319, 307; 29/890.14
See application file for complete search history.

(56) References Cited

U.S. PATENT DOCUMENTS

| 730,378 | A | 6/1903 | Lambert |
|---|---|---|---|
| 1,232,272 | A | 7/1917 | Frazier et al. |
| 1,837,345 | A | 12/1931 | Thomas |
| 1,976,589 | A | 10/1934 | Trickey |
| 3,120,968 | A | 2/1964 | Calvin |
| 3,780,773 | A | 12/1973 | Haugen |
| 4,093,279 | A | 6/1978 | Verdesca et al. |
| 4,136,885 | A | 1/1979 | Uhrner |
| 4,158,407 | A | 6/1979 | Rest |
| 4,193,616 | A | 3/1980 | Sarson et al. |
| 4,376,525 | A | 3/1983 | Fremy |
| 4,423,892 | A | 1/1984 | Bartholomew |
| 4,483,371 | A | 11/1984 | Susin |
| 4,483,543 | A | 11/1984 | Fisher, Jr. et al. |
| 4,601,497 | A | 7/1986 | Bartholomew |
| 4,632,434 | A | 12/1986 | Proctor et al. |
| 4,647,012 | A | 3/1987 | Gartner |
| 4,681,351 | A | 7/1987 | Bartholomew |
| 4,725,081 | A * | 2/1988 | Bauer .................. 285/305 |
| 4,753,458 | A | 6/1988 | Case et al. |
| 4,846,506 | A | 7/1989 | Bocson et al. |
| 4,869,534 | A | 9/1989 | Ketcham et al. |
| 4,915,136 | A | 4/1990 | Bartholomew |
| 4,951,975 | A * | 8/1990 | Bartholomew .......... 285/111 |
| 5,033,513 | A | 7/1991 | Bartholomew |
| 5,168,902 | A | 12/1992 | Hood |
| 5,195,787 | A | 3/1993 | Bartholomew |

(Continued)

FOREIGN PATENT DOCUMENTS

EP  1369634  12/2003

(Continued)

*Primary Examiner*—David Bochna
(74) *Attorney, Agent, or Firm*—Young & Basile, P.C.

(57) ABSTRACT

A fluid quick connector includes a housing which sealingly receives a tubular endform latched in the housing by a movable retainer. An axially slidable top hat is mounted in the bore in the housing and has axially extending posts with ends disposed in the path of movement of the retainer when the top hat is in a biased first position. Biasing members are formed on the retainer to normally bias the retainer to the first position. The biasing members are cantileveredly movable by contact with the inner surfaces of the bore in the housing under forced insertion of the endform into the housing through contact between the annular flange on the endform and the posts on the top hat enabling the endform to be fully sealingly inserted into the bore in the housing before of the retainer can be moved to the latched position to latch the endform in the housing.

38 Claims, 4 Drawing Sheets

U.S. PATENT DOCUMENTS

| | | | | |
|---|---|---|---|---|
| 5,211,427 A | * | 5/1993 | Washizu | 285/23 |
| 5,219,188 A | | 6/1993 | Abe et al. | |
| 5,342,095 A | | 8/1994 | Klinger et al. | |
| 5,364,131 A | | 11/1994 | Hartsock et al. | |
| 5,395,140 A | | 3/1995 | Wiethorn | |
| 5,401,063 A | | 3/1995 | Plosz | |
| 5,405,175 A | | 4/1995 | Bonnah et al. | |
| 5,472,016 A | | 12/1995 | Szabo | |
| 5,492,371 A | | 2/1996 | Szabo | |
| 5,542,716 A | | 8/1996 | Szabo | |
| 5,649,724 A | | 7/1997 | Wiethorn | |
| 5,683,117 A | | 11/1997 | Corbett et al. | |
| 5,707,084 A | | 1/1998 | Szabo | |
| 5,730,481 A | * | 3/1998 | Szabo et al. | 285/305 |
| 5,782,502 A | * | 7/1998 | Lewis | 285/87 |
| 5,863,077 A | * | 1/1999 | Szabo et al. | 285/3 |
| 5,882,048 A | | 3/1999 | Kawasaki et al. | |
| 5,924,746 A | | 7/1999 | Fixemer | |
| 5,951,063 A | | 9/1999 | Szabo | |
| 6,142,537 A | | 11/2000 | Shimada et al. | |
| 6,155,612 A | | 12/2000 | Szabo | |
| 6,173,998 B1 | | 1/2001 | Bock | |
| 6,186,561 B1 | | 2/2001 | Kaishio et al. | |
| 6,234,544 B1 | | 5/2001 | Bartholomew | |
| 6,293,596 B1 | * | 9/2001 | Kinder | 285/305 |
| 6,338,506 B1 | * | 1/2002 | Kubota et al. | 285/319 |
| 6,371,529 B1 | | 4/2002 | Szabo et al. | |
| 6,431,612 B1 | | 8/2002 | Walker et al. | |
| 6,520,546 B1 | * | 2/2003 | Szabo | 285/308 |
| 6,540,263 B1 | * | 4/2003 | Sausner | 285/305 |
| 6,634,679 B1 | | 10/2003 | Stieler | 285/308 |
| 6,767,034 B1 | * | 7/2004 | Le Clinche | 285/319 |

FOREIGN PATENT DOCUMENTS

| | | |
|---|---|---|
| GB | 2 077 377 | 12/1981 |

* cited by examiner

FALSE INSERTION PROTECTION TOP HAT FOR FLUID QUICK CONNECTORS

BACKGROUND

The present invention relates, in general, to fluid quick connectors which couple mating connector components.

Snap-fit or quick connectors are employed in a wide range of applications, particularly, for joining fluid carrying conduits in automotive and industrial application. Such quick connectors utilize retainers or locking elements for securing a first connector component, such as a tubular conduit, within a complimentary bore of a second connector component or housing. Such retainers are typically of either the axially-displaceable or radially-displaceable type. The terms "axially-displaceable" or "radially-displaceable" are taken relative to the axial bore through the first component.

In a typical quick connector with an axially displaceable, retainer, the retainer is mounted within a bore in a housing of one connector component. The retainer has a plurality of radially and angularly extending legs which extend inwardly toward the axial center line of the bore in the housing. A tube or conduit to be sealingly mounted in the bore in the housing includes a radially upset portion or flange which abuts an inner peripheral surface of the retainer legs. Seal and spacer members as well as a bearing or top hat are typically mounted in the bore ahead of the retainer to form a seal between the housing and the end form of the tube when the end form is lockingly engaged with the retainer legs.

Radially displaceable retainers are also known in which the retainer is radially displaceable through aligned bores or apertures formed transversely to the main throughbore in the housing. The radially displaceable retainer is typically provided with a pair of depending legs which are sized and positioned to slip behind the radially upset portion or flange on the conduit only when the conduit is fully seated in the bore in the housing. This ensures a positive locking engagement of the conduit with the housing as well as providing an indication that the conduit is fully seated since the radially displaceable retainer can be fully inserted into the housing and sealed only when the conduit has been fully inserted into the bore in the housing.

Regardless of the type of retainer, the housing portion of a fluid connector typically includes an elongated stem having one or more annular barbs spaced from a first end. The barbs provide secure engagement with a hose or conduit which is forced over the barbs to connect the housing with one end of the conduit.

Frequently, applications arise which require a shortened axial length quick connect. Specifically, the distance between the back of the endform bead or flange in the face of the quick connect housing needs to be shortened, such as to less than 5.8 mm. In such a shortened housing length design, it is possible for the endform to be installed in the quick connect housing and sealingly disposed within the seal members or O-rings at the same time the retainer is latched in front of the bead or flange on the endform. This gives the assembler the false sense that the quick connect housing and endform are properly sealingly connected. During use, the connection can potentially separate leading to a potentially damaging fluid leak.

Thus, it would be desirable to provide a fluid quick connector having means for indicating a false or incomplete insertion of the endform into a short length quick connector housing.

SUMMARY

The present invention is a false insertion protection top hat for fluid quick connectors. In one aspect, the invention includes a fluid quick connector including a connector housing having a throughbore configured to mate with an endform, a seal member mounted in the bore adapted to seal the endform in the connector housing, a top hat mounted in the bore of the connector housing axially adjacent to the seal member, the top hat movable between a first position indicating a non-fully inserted position of the endform in the connector housing and a second position upon contact with and full insertion of the endform into the housing, and retainer means, transversely mounted in the housing, for latching the endform in the housing, the retainer means movable from a first non-latching position with respect to the endform to a second latching position only when the endform has moved the top hat to the second position.

The top hat further includes means for biasing the top hat to the first position, the biasing means being movable to a position allowing sliding movement of the top hat to the second position in the bore in the housing. The biasing means may be monolithically formed on the top hat in the shape of one or more spring arms.

One end of each spring arm extends radially and angularly outward from a longitudinal axis through the top hat so as to biasingly engage the edge of the housing surrounding the bore to normally bias the top hat to a first position prior to insertion with the endform.

When in the first position, means, provided on the top hat, are positioned to block movement of a retainer from a first position with respect to the connector housing to a second position in which the retainer normally latches the endform in the bore in the housing.

In another aspect, the invention is a top hat which provides false insertion protection for a quick connector having a housing with a throughbore configured to mate with an endform, a seal member mounted in the bore adapted to seal the housing to the endform and a retainer transversely mounted in the housing for latching the endform in the housing. The retainer is moveable from a first non-latching position with respect to the endform to a second latching position latching the endform in the housing. The top hat includes an annular end portion insertable into the bore in the housing. Biasing means extend from the annular portion for biasing the top hat to a first position indicating a non-fully inserted position of the endform in the housing. The biasing means is moveable to a position allowing sliding insertion of the top hat to a second position in the bore in the housing at full insertion of the endform in the housing. Means extend from the annular portion for preventing movement of the retainer to the second position when the endform is not in the fully inserted position. The retainer movement preventing means extending into the path of movement of the retainer to the second position when the top hat is in the first position. In this aspect, the top includes one or more spring biasing arms and one or more posts to block the retainer.

In another aspect, the invention is a method of A method for preventing false sealing insertion of an endform in a fluid quick connector, the method comprising the steps of providing a connector housing with a bore extending from a first end, providing a seal member in the bore, providing a retainer moveable from a first position with respect to the housing to a second position in the housing to latch the endform in the housing, providing a top hat mountable in the bore to fix the seal member in the bore, providing means for blocking insertion of the retainer to the second position until the endform has been fully inserted into the bore and sealing engagement with the seal member, moving the top hat to a first position to block movement of the retainer to the second position, forcibly inserting the top hat to the second position with respect to the housing during insertion contact with the endform into the bore and the housing to allow the retainer to move to the second position, the second position of the top hat coinciding with the fully sealed position of the endform in the housing.

The present top hat with false insertion protection uniquely prevents movement of a retainer to the fully latched position in a fluid quick connector housing until the end form has moved the top hat from a retainer movement blocking position further into the bore in the housing whereby the retainer can be fully moved to the latched position thereby assuring that the endform is fully engaged in the seal members mounted in the housing bore. This is particularly advantageous with short length quick connector bodies.

BRIEF DESCRIPTION OF THE DRAWING

The various features, advantages and other uses of the present invention will become more apparent by referring to the following detailed description and drawing in which.

DETAILED DESCRIPTION

Figure 1:
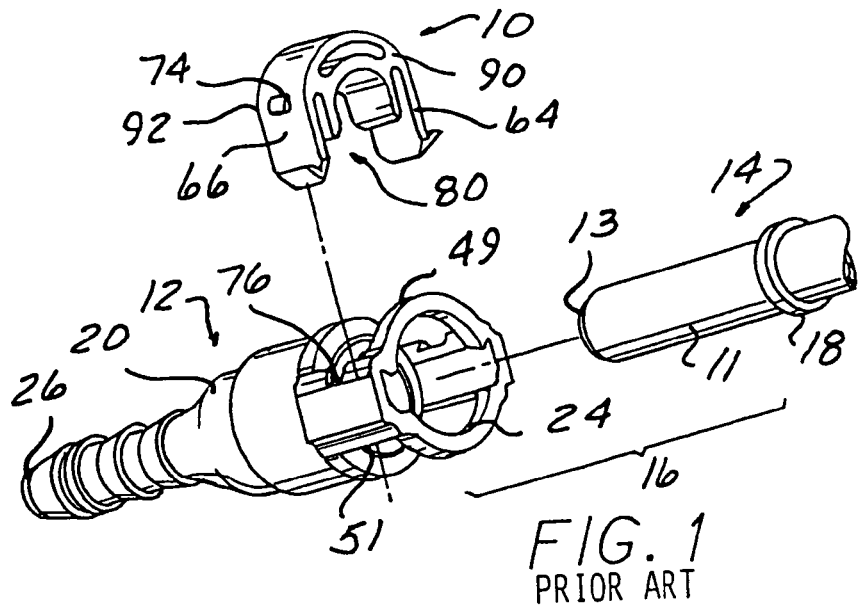
FIG. 1 is an exploded, perspective view of a prior art quick connector according to the present invention.

For clarity in understanding the use and operation of the present invention, reference will first be had to FIGS. 1–5 which depict a retainer 10 which lockingly couples first and second components 12 and 14, respectively, of a prior art quick connector 16.

The following description of the first connector component or element 12 is by way of example only as the first connector component 12 may have any suitable shape typically found in quick connectors.

Further, the following description of the use of the quick connector to connect tubular members will be understood to apply to the connection of conduits, hoses, and/or solid metal or plastic tubes to each other in fluid flow communication. The end of a conduit or tubular member inserted into the interior of one end of the quick connect is defined as an endform. The endform can be a separate member which receives a separate hose or conduit at one end or a shape integrally formed on the end of an elongated metal or plastic tube. Further, the endform can be integrally formed on or mounted as a separate element to a fluid use device, such as a pump, filter, etc., rather than as part of an elongated conduit.

Figure 5:
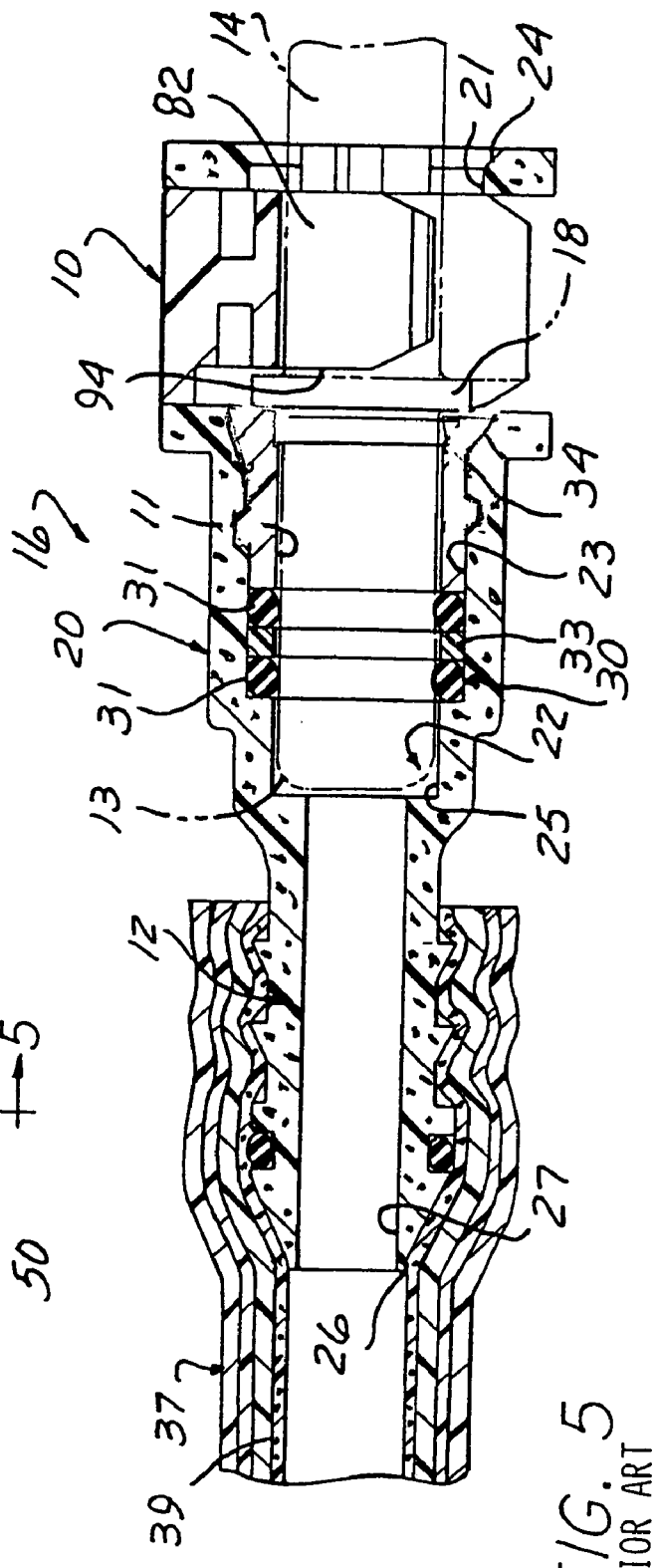
FIG. 5 is a cross sectional view generally taken along line 5—5 of the prior art quick connector shown in FIG. 4.

The first connector component 12 includes a housing 20 having an elongated, axially extending, internal stepped bore 22, shown in detail in FIG. 5, extending from a large diameter first, open end 24 to a smaller diameter, second open end 26. The stepped bore 22 includes a first bore portion 21 extending from an opening at the first end 24 of the housing 20 to a second smaller diameter second stepped bore portion 23. A third yet smaller diameter stepped bore portion 25 extends axially from one end of the second stepped bore portion 23 and communicates to a still smaller fourth stepped bore portion 27 which extends to the open second end 26 of the housing 20.

As is conventional, a top hat or bearing 34 is mounted in the second stepped bore portion 23 immediately adjacent the end of the first bore portion 21. A seal means 30 is also mounted in the second stepped bore portion 23 between one end of the top hat 34 and the third stepped bore portion 25.

The inner diameter of the first stepped bore portion 21 is sized to slidably receive the outer diameter of the radially enlarged flange or upset bead 18 formed on the second component or fitting 14. Further, the inner diameters of the seal means 30 and the top hat 34 are sized to sealingly engage the outer diameter of the end portion 11 of the second component 14 extending from the radially enlarged flange 18 to the tip end 13 of the second component 14. The third stepped bore portion 25 has an inner diameter sized to snugly engage the outer diameter of the end portion 11 of the second component 14 when the second component 14 is fully inserted into the stepped bore 22 as described hereafter.

Figure 3:
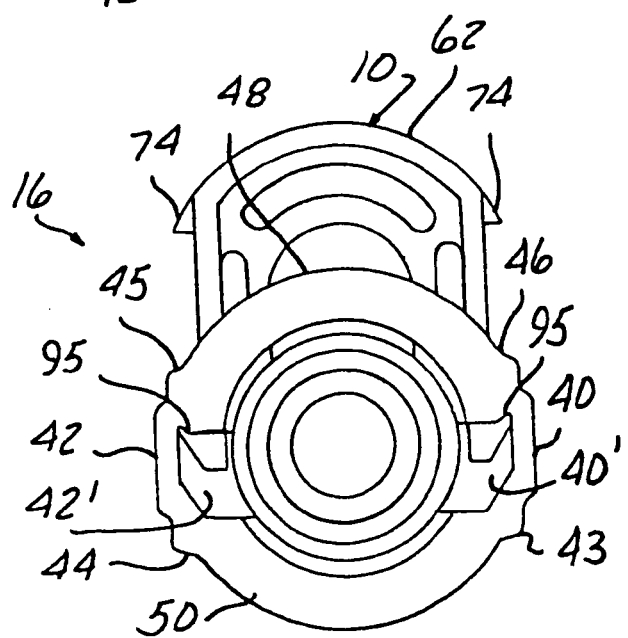
FIG. 3 is an end view of the prior arty quick connector and retainer, with the retainer shown in a partially inserted, storage position.
Figure 4:
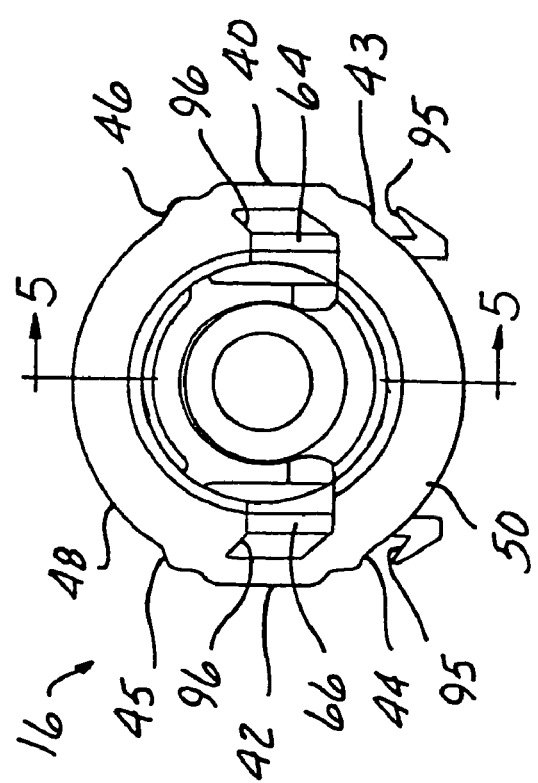
FIG. 4 is an end view of the prior art quick connector and retainer, with the retainer depicted in a fully inserted, position in the first component.

As shown in FIGS. 1, 3, and 4, the first end 24 of the housing 12 is formed with a pair of opposed, exterior flat surfaces 40 and 42. The flat surfaces 40 and 42 are diametrically opposed on the first end 24 and may be centrally located on each diametrical side of the first end 24. The adjacent surfaces of the housing 20 to one side of the flat surfaces 40 and 42 form an opposed pair of lock surfaces or flats, such as a first flat 43 and a second flat 44. A second pair of flats 45 and 46 are formed on the housing 12 or the other side of the flat surfaces 40 and 42. The flats 43 and 44 extend axially a short distance from the first end 24 of the housing 20. Opposed surfaces 48 and 50 of the first end 24 of the housing 20 between the flats 43 and 44 and the flats 45 and 46 have a generally arcuate shape as shown in FIGS. 3 and 4. Apertures 49 and 51 are formed respectively in each surface 48 and 50. The apertures 49 and 51 are aligned to form a transverse bore extending through the first end 24 of the housing 20 which is disposed in communication with the first bore portion 21 in the housing 20.

The retainer 10, described hereafter, is by way of example only as other radially-displaceable retainer designs having side locking projections may also employ the release tool of the present invention. Alternately, the housing 12 can be reconfigured to receive an axial-type retainer.

The retainer 10 is formed of a one-piece body of a suitable plastic, such as polyketone, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72, although it is also possible to connect the side legs 64 and 66 at a lower portion by an arcuate member.

A pair of projections 70 extend along the length of the retainer 10 between opposed side edges of the side legs 64 and 66, respectively. The projections 70 are located adjacent the outer end 72 of each leg 64 and 66. The projections 70 engage surfaces on the housing 12 to position the retainer 10 in the shipping position shown in FIG. 3, or in the fully inserted, latched position shown in FIGS. 4 and 5.

Further, a pair of outward extending lock tabs or edges 74 are formed adjacent the end wall 62 on each side leg 64 and 66.

As shown in FIGS. 1–5, the retainer 10 includes a radially flange receiving means 80 which is preferably carried as an integral, one-piece part of the retainer 10. The radial flange receiving means 80 includes first and second depending arms 82 and 84 which extend from a boss or enlargement 86 integrally formed on the inner surface of the end wall 62 of the retainer 10. An inverted, U-shaped slot 88 is formed on the inner surfaces of the arms 82 and 84 and the boss 86 which is sized to snugly conform to the outer diameter of the tubular portion 11 of the second component 14. The outer ends 91 of each of the arms 82 and 84 are angled or tapered to act as a guide surface to assist in sliding movement of the arms 82 and 84 over the tubular end 11 of the second component 14.

Figure 2:
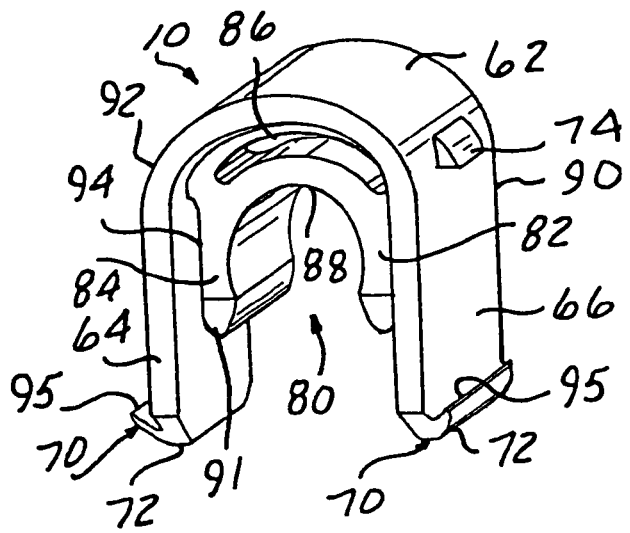
FIG. 2 is an enlarged, left end, perspective view of the prior art retainer shown in FIG. 1.

As shown in FIGS. 1 and 2, each of the arms 82 and 84 extends from one side end contiguous with a first side end 90 of the retainer 10 to an opposed side end contiguous with a second side end 92 of the retainer 10.

As shown in FIGS. 1, 2, 3 and 4, the projections 70 on the legs 64 and 66 of the retainer 10 are formed with an angled hook-like shape terminating in a tip 95. The tip 95 is disposed at an acute, upturned angle with respect to the corresponding legs 64 and 66.

Figure 6:
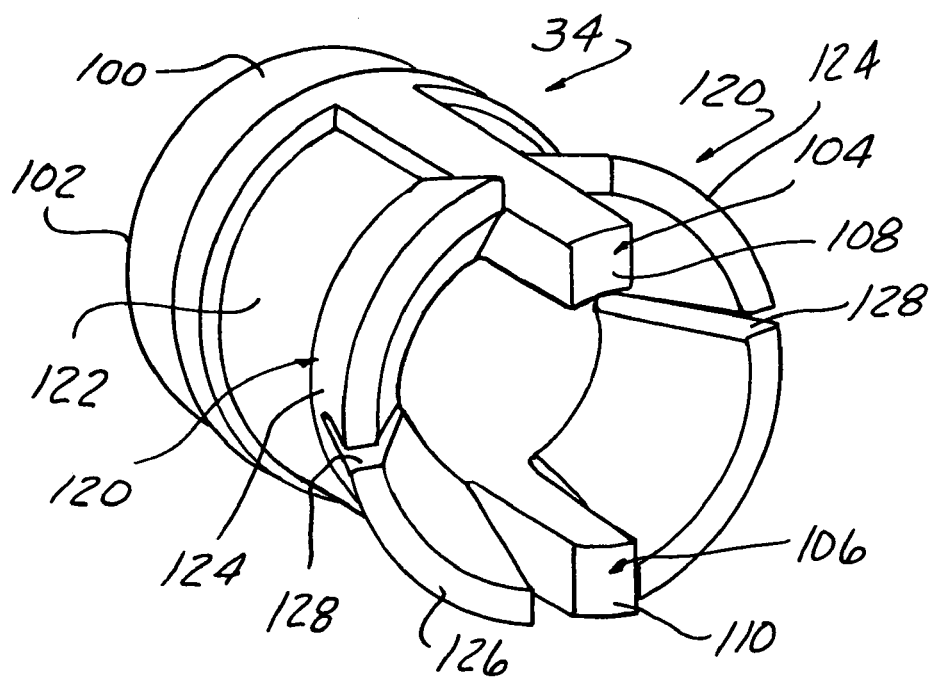
FIG. 6 is a perspective view of a top hat according to the present invention.

Similarly, as shown in FIGS. 3 and 4, and in greater detail in FIG. 6, the grooves 40' and 42' are formed in the interior of the flat surfaces 40 and 42, respectively, and include a recess or notch 96 at one end which is shaped complimentary to the shape of the tip 95 of the projection 70 on each of the legs 64 and 66 of the retainer 10. In this manner, pull out of the retainer 10 from the housing 12 is resisted by the interlocking tips 95 on the legs 64 and 66 of the retainer 10 which are seated within the notches 96 in the grooves 40' and 42' in the housing 12 as shown in the partially inserted, shipping position of the retainer 10 in FIG. 3. The flats or lock edges 44 and 46 are disposed at an angle complimentary to the acute angle of the tips 95 on the legs 64 and 66 of the retainer 10. This enables interlock of the tips 95 with the flats 44 and 46 resists pull out of the retainer 10 from the housing 12 from the fully latched position shown in FIG. 4.

The hook shaped tips 95 on the legs 64 and 66 of the retainer 10 in conjunction with the grooves 40' and 42' in the housing 12 also provide, a distinct, "avalanche effect" snap action of the retainer 10 in the housing 12. The grooves 40' and 42' in the housing 12 are formed in generally planar flat surfaces. The inner surfaces force the ends 72 of the legs 64 and 66 laterally inward toward each other when the retainer 10 is inserted into the housing 12. When the tips 95 clear one edge of the grooves 40' and 42', the resilient nature of the legs 64 and 66 snaps the ends 72 and the tips 95 laterally outward to create an "avalanche effect" which provides a distinct tactile feedback to the user indicating that the retainer has lockingly engaged the housing 12 in either the partially inserted position shown in FIG. 3 or the fully inserted position shown in FIG. 4.

It should be noted that further insertion force on the retainer 10 moving the retainer 10 from the partially inserted position shown in FIG. 3 to the fully inserted position shown in FIG. 4 again causes the end 72 of the legs 64 and 66 to be urged laterally inward when the tips 95 of the legs 64 and 66 slide along the lower portion of the inner surfaces. When the tips 95 clear the outer end of the inner surfaces, the legs 64 and 66 spring laterally outward in a distinct "avalanche effect" manner. The lower ends of the grooves 40' and 42' are angled to enable the tips 95 to slide out of the grooves 40' and 42' toward the fully latched position.

The retainer 10 can be first be installed on the housing 12 in a shipping or storage position as shown in FIG. 3. In this position, the projections 70 on the side legs 64 and 66 of the retainer 10 snap into and engage the longitudinally extending grooves 40' and 42'.

Further insertion of the retainer 10 through the aligned apertures 49 and 51 in the housing 12 causes the ends 72 of the legs 64 and 66 to pass along the lower portion of the inner surfaces of the flat surfaces 40 and 42 until the tips 95 clear the ends of the surfaces and then snap outward exteriorly of the outer surface of the first end 24 of the housing 12 as shown in FIG. 4. In this fully inserted position of the second component 14 in the first component 12, the annular flange 18 on the second component 14 is situated ahead the arms 82 and 84 of the retainer 10. This position represents the fully latched position in which the second component 14 is fully seated in and lockingly engaged with the second component 12. The full insertion of the retainer 10 into the housing 12 also provides visible indication of the fully locked connection of the second and first components 14 and 12, respectively.

It should be noted that if the second component 14 is not fully engaged or seated within the housing 12, the annular flange 18 on the second component 14 will not be properly situated within the transverse bore in the housing 12 to slidably receive the arms 82 and 84 in the retainer 10. If the annular flange 18 on the second component 14 is at any position other than shown in phantom in FIG. 5, the arms 82 and 84 on the retainer 10 will contact the annular flange 18. Since the spacing between the inner surfaces of the legs 82 and 84 is less than the outer diameter of the annular flange 18, the retainer 10 cannot be moved to the fully inserted position thereby providing an indication of an incomplete seating or mounting of the end portion 11 of the second component 14 in the housing 12.

Figure 8:
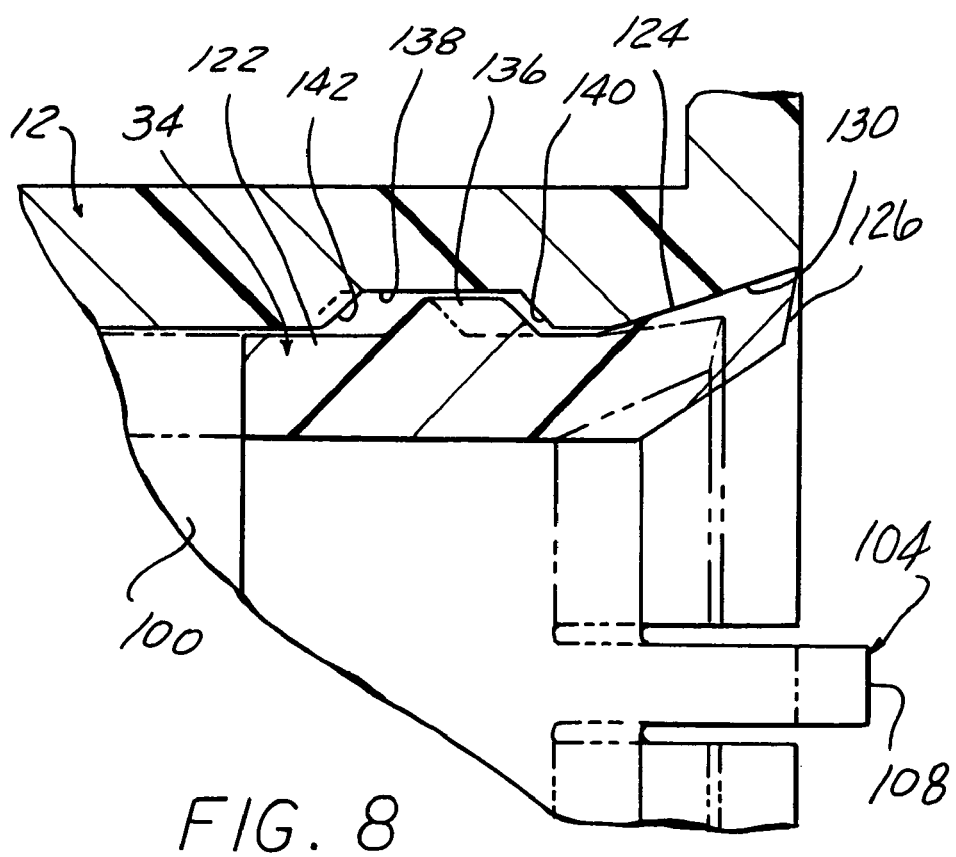
FIG. 8 is an enlarged, partial longitudinal cross-sectional view showing the top hat of FIG. 7 in a fully inserted position.
Figure 7:
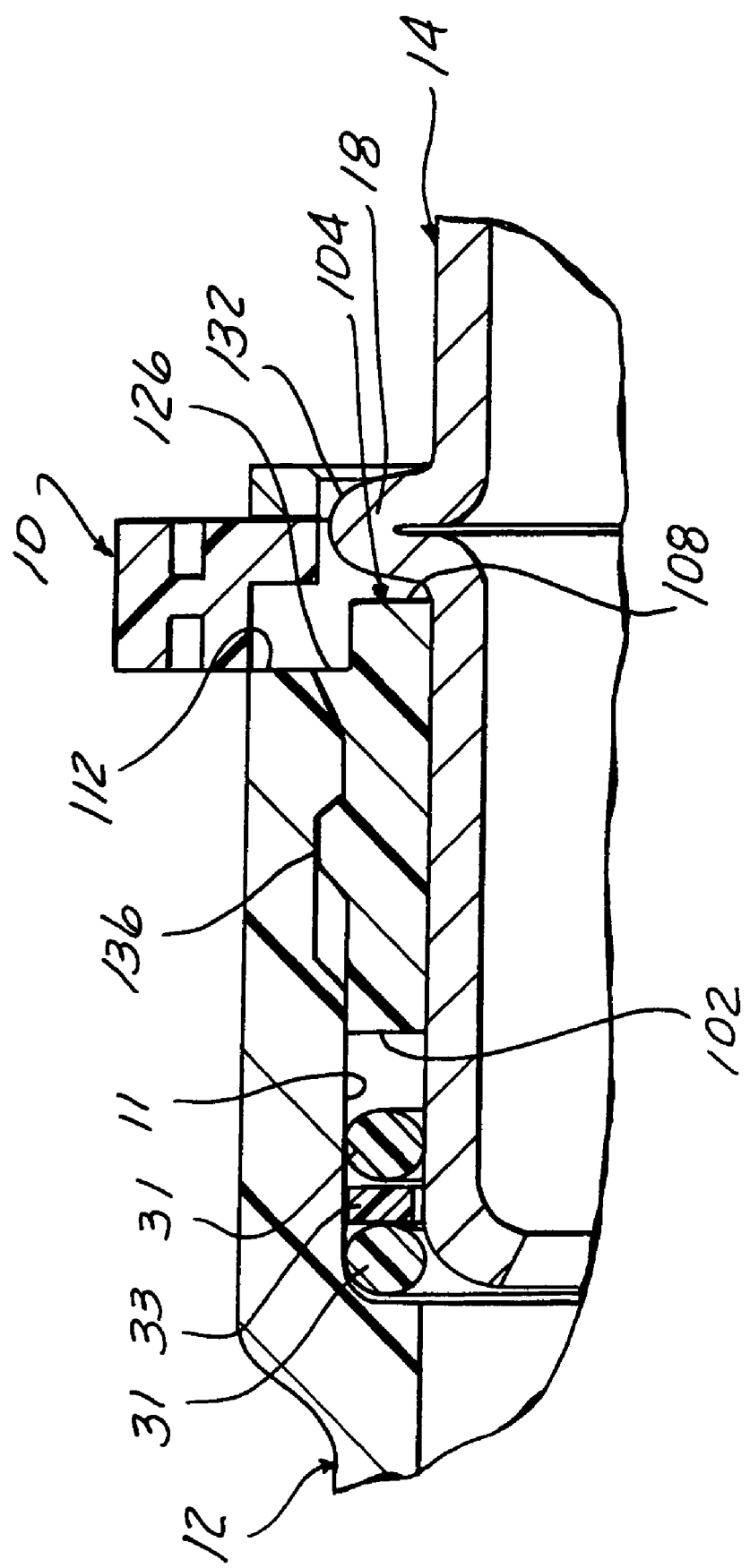
FIG. 7 is a longitudinal cross-sectional view showing the top hat of the present invention a retainer blocking, position.

As shown in FIG. 5, and in greater detail in FIGS. 6–8, the top hat 34 is provided with a false insertion protection feature which ensures that the second component or endform 14 is fully inserted past the seals or O-rings 31 to the fully inserted position shown in FIG. 5 before the retainer 10 can be moved to the fully latched position, also shown in FIG. 5.

As shown in FIG. 6, the top hat 34 includes a generally annular collar 100 at a first end 102. A plurality of posts or beams, with two posts or beams 104 and 106 being shown by way of example only, are monolithically and integrally formed with the collar 100 and extend generally axially therefrom in parallel with a longitudinal axis extending through a hollow bore in the collar 100.

The posts 104 and 106 have the illustrated polygonal or square cross-section by way of example only. It will be understood that the posts 104 and 106 may have other cross-sections, such as circular, arcuate etc.

The length of the posts 104 and 106 is selected such that the outer ends 108 and 110 of the posts 104 and 106, respectively, fit substantially completely within the bore 11 in the housing 12 when the bead or flange 18 on the endform 14 is fully inserted into the bore 11. The posts 104 and 106 are illustrated as being diametrically opposed on the collar 100. Other circumferentially spaced locations may also be employed for a positioning of the posts 104 and 106.

The top hat 34 uniquely includes biasing means for normally biasing the ends 108 and 110 of the posts 104 and 106, respectively, outward beyond the inner end 112 of the bore 11 in the housing 12 when the endform 14 is not fully inserted into the bore 11. The basing means denoted by the reference number 120 includes at least one or more such as a pair of diametrically opposed cantilevered biasing members extending from the collar 10 and interposed between the posts 104 and 106. Each of the biasing means or members 120 includes a generally arcuate cross section, first portion 122 extending immediately from one edge of the collar 100 and a partial conically shaped, radially and angularly outward extending portion 124. The outer end 126 of the conically shaped portion 124 lies in a different plane than the axial extent of the first portion 122 of each biasing member 120. A discontinuity or notch 128 may be formed in each biasing member 120 extending inward for a short distance from the outer end 126, substantially through the entire conical shaped section 124. At least the conical portion 124, and some or all of the first portion 122 of each biasing member 120 is capable of flexure with respect to the collar 100.

FIG. 6 and the solid lines in FIG. 8 depict the normal, biased position of the top hat 34. Further, the normal, biased between the outermost edges of the opposed ends 126 of the biasing members 120 is greater than the inside diameter of the end 112 of the housing 12 through which the bore 11 extends. In this manner, the angularly outward shape of the conical ends 124 of the biasing members 120 coupled with the flexible nature of the biasing members 120 due to their cantilevered extension from the collar 100 combine to normally urge the top hat 34 axially outward from the bore 11 to the position shown in FIG. 7 and in solid lines in FIG. 8 In this position, the ends 108 and 110 of the posts 104 and 106 project axially outward beyond the edge 112 of the bore 11 in the housing 12 so as to be disposed in the path of movement of the retainer 10 to its latched position. An installer would feel the contact between the retainer 10 and the posts 104 and 106 if he attempted to slide the retainer 10 from the unlatched or temporary storage position shown in FIG. 7 to the latched position. This immediately tells the installer that the endform 14 is not in the fully inserted, sealed position in the housing 12.

During insertion of the endform 14 into the bore 11 in the housing 12, the annular flange or bead 18 will initially contact the ends 108 and 110 of the posts 104 and 106, respectively. Continued insertion of the endform 14 into the bore 11 will cause the top hat 34 to axially slide in a direction into the bore 11. Since the insertion force required to insert the endform 14 into the bore 11 is greater than the biasing force exerted by the conical portion 124 of the biasing members 120, the conical portions 124 will bend radially inward clearing the angular end portion 130 of the bore 11 thereby enabling the collar 100 of the top hat 34 to slide further into, the bore 11 into contact with the endmost seal or O-ring 31.

When the endform 14 has been fully inserted with a tip end in a sealing contact with the O-rings 31, as shown in FIG. 7, the bead 18 on the endform 14 will be located in position allowing movement of the retainer 10 to the fully latched position with the inner legs or arms 82 and 84 of the retainer 10 being slidable past the outer edge 132 of the bead 18 to latch the endform 14 in the housing 12.

As shown in FIGS. 7 and 8, a raised annular projection 136 may be formed on the first portion 122 of each biasing member 120. The projection 136 slides within a recess 138 formed in the bore 11. Opposed ends 140 and 142 of the recess defined end limits of travel of the projection 136 and thereby the entire top hat 34. These end limits of travel define the normally outward biased position shown in solid in FIG. 8 and the innermost, unbiased position shown in phantom in FIG. 8.

In conclusion, there has been disclosed a unique fluid quick connector which utilizes a top hat having false insertion protection. The top hat is formed and positioned to prevent movement of the retainer to the fully latched position until the endform has been fully inserted into the bore in the housing in full sealed contact with the seal members in the bore. This prevents a false insertion condition in which portions of the tip end of the endform may be in contact with portions of the seal members, but the retainer is in its fully latched position axially ahead of the bead on the endform. Use of the quick connector in this state could subsequently result in separation of the endform from the housing resulting in a fluid leak.

What is claimed is:

1. A fluid quick connector comprising:
 a connector housing having a throughbore configured to mate with an endform;
 a seal member mounted in the bore adapted to seal the connector housing to the endform;
 a top hat mounted in the bore of the connector housing axially adjacent to the seal member, the top hat movable between a first position indicating a non-fully inserted position of the endform in the connector housing and a second position upon contact with and full insertion of the endform into the housing;
 biasing means unitarily formed on the top hat for biasing the top hat to the first position, the biasing means being movable to a position allowing sliding movement of the top hat to the second position in the bore in the housing upon contact with an endform inserted into the bore in the housing; and
 retainer means, transversely mounted in the housing, for latching the endform in the housing, the retainer means movable from a first non-latching position with respect to the endform to a second latching position only when the endform has moved the top hat to the second position.

2. The fluid quick connector of claim 1 wherein:
 the biasing means is monolithically formed on the top hat.

3. The fluid quick connector of claim 1 wherein the biasing means comprises:
 at least one spring arm.

4. The fluid quick connector of claim 3 wherein:
 the spring arm is flexible.

5. The fluid quick connector of claim 3 wherein the spring arm has an end portion disposed at a larger outside diameter than the diameter of the bore.

6. The fluid quick connector of claim 3 further comprising:
 a notch formed in the end of the spring arm allowing radially inward flexing of the spring arm.

7. The fluid quick connector of claim 3 wherein the spring arm comprises:
 a pair of spring arms.

8. The fluid quick connector of claim 7 wherein the pair of spring arms are diametrically opposed on the top hat.

9. The fluid quick connector of claim 3 wherein to spring arm comprises
   an annular portion slidable into the bore in the housing.
10. The fluid quick connector of claim 1 wherein the top hat further comprises:
   means for preventing movement of the retainer means to the second position.
11. The fluid quick connector of claim 10 wherein:
   the movement preventing means extends into the path of movement of the retainer means to the second position when the top hat is in the first position.
12. The fluid quick connector of claim 1 wherein:
   the retainer includes means for latching the retainer in a first position in the housing and allowing insertion of the endform therepast into the bore in the housing.
13. The fluid quick connector of claim 12 wherein the retainer further comprises:
   inner legs having an inner diameter smaller than an outer diameter of an enlarged flange on the endform.
14. The fluid quick connector of claim 1 further comprising:
   stop means, carried on the top hat and the connector housing, for defining end of travel limits of the top hat between the first position and the second position.
15. The fluid quick connector of claim 14 wherein the stop means comprises:
   a projection extending from one of the top hat and the connector housing; and
   a recess formed in the other of the connector housing and the top hat and having opposed ends, the projection sliding between the opposed ends of the recess between the first and second positions of the top hat.
16. A fluid quick connector comprising:
   a connector housing having a throughbore configured to mate with an endform;
   seal means disposed in the bore for sealing the connector housing to the endform;
   a top hat mounted in the bore of the connector housing axially adjacent to the seal means, the top hat movable between a first position indicating a non-fully inserted position of the endform in the connector housing and a second position upon contact with and full insertion of the endform into the housing;
   means, monolithically formed on the top hat for biasing the top hat to the first position, the biasing means including a pair of spring arms carried on the top hat; and
   retainer means, transversely mounted in the housing, for latching the endform in the housing, the retainer means movable from a first non-latching position with respect to the endform to a second latching position only when the endform has moved the top hat to the second position.
17. The fluid quick connector of claim 16 wherein:
   the spring arms are flexible.
18. The fluid quick connector of claim 16 wherein the spring arms have end portions disposed at a larger outside diameter than the diameter of the bore.
19. The fluid quick connector of claim 16 further comprising:
   a notch formed in the end of the spring arms allowing angularly inward flexing of each spring arm.
20. The fluid quick connector of claim 16 wherein:
   the spring arms are diametrically opposed.
21. The fluid quick connector of claim 16 wherein the top hat further comprises:
   means for preventing movement of the retainer means to the second position.
22. The fluid quick connector of claim 21 wherein:
   the movement preventing means extends into the path of movement of the retainer means to the second position when the top hat is in the first position.
23. The fluid quick connector of claim 16 further comprising:
   stop means, carried on the top hat and the connector housing, for defining end of travel limits of the top hat between the first position and the second position.
24. The fluid quick connector of claim 23 wherein the stop means comprises:
   a projection extending from one of the top hat and the connector housing; and
   a recess formed in the other of the connector housing and the top hat and having opposed ends, the projection sliding between the opposed ends of the recess between the first and second positions of the top hat.
25. The fluid quick connector of claim 16 wherein the spring arms comprise:
   an annular portion slidable into the bore in the housing.
26. A top hat for a fluid quick connector including a housing having a throughbore configured to mate with an endform, a seal member mounted in the bore adapted to seal the housing to the endform and a retainer transversely mounted in the housing for latching the endform in the housing the retainer moveable from a first non-latching position with respect to the endform to a second latching position latching the endform in the housing, the top hat comprising:
   an annular end portion insertable into the bore in the housing;
   biasing means, unitarily formed on the top hat and extending from the annular portion, for biasing the top hat to a first position indicating a non-fully inserted position of the endform in the housing, the biasing means moveable to a position allowing sliding insertion of the top hat to a second position in the bore in the housing upon insertion of the endform in the housing; and
   means, extending from the annular portion, for preventing movement of the retainer to the second position, the retainer movement preventing means extending into the path of movement of the retainer to the second position when the top hat is in the first position.
27. The top hat of claim 26 further comprising:
   the biasing means disposed for angular flexing.
28. The top hat of claim 26 wherein the biasing means comprises:
   an arcuate segment extending from the annular portion of the top hat; and
   an radially and angularly outward extending end portion extending from the arcuate segment.
29. A top hat for a fluid quick connector including a housing having a throughbore configured to mate with an endform, a seal member mounted in the bore adapted to seal the housing to the endform and a retainer transversely mounted in the housing for latching the endform in the housing, the retainer moveable from a first non-latching position with respect to the endform to a second latching position latching the endform in the housing, the top hat comprising:
   an annular end portion insertable into the bore in the housing;
   biasing means, extending from the annular portion, for biasing the top hat to a first position indicating a non-fully inserted position of the endform in the housing, the biasing means moveable to a position allowing sliding insertion of the top hat to a second position in the bore in the housing upon insertion of the endform in the housing; and means, extending from the annular portion, for preventing movement of the retainer to the second position, the retainer movement preventing means extending into the path of movement of the retainer to the second position when the top hat is in the first position;

the biasing means including a pair of circumferentially spaced spring arms; and the retainer movement preventing means including at least one post extending from the annular portion of the top hat, an end of the post extending axially beyond an end of the spring arms.

30. The top bat of claim 29 wherein:

the at least one post includes a pair of circumferentially spaced posts; and the pair of spring arms and the pair of posts are alternatingly arranged about an arcuate portion of the top hat.

31. A method for preventing false sealing insertion of an endform in a fluid quick connector, the method comprising the steps of:

providing a connector housing with a bore extending from a first end;

providing a seal member in the bore;

providing a retainer moveable from a first position with respect to the housing to a second position in the housing to latch the endform in the housing;

providing a top hat mountable in the bore to maintain the seal member in the bore; providing means for blocking movement of the retainer to the second position until the endform has been fully inserted into the bore in sealing engagement with the seal member;

forming unitary biasing means on the top hat for biasing the top hat to a first position to block movement of the retainer to the second position;

moving the top hat to the second position in the housing during contact with the endform inserted into the bore and the housing to allow the retainer to move to the second position, the second position of the top hat coinciding with the fully sealed position of the endform in the housing.

32. The method of claim 31 wherein the step of providing means for blocking movement of the retainer to the second latching position comprises the step of:

providing at least one post extending from an annular portion of the top hat, the post having an end spaced from the annular portion of the top hat extending into the path of movement of the retainer to block movement of the retainer to the second position when the top hat is in the first position.

33. The method of claim 31 wherein the step of moving the top hat to the second position comprises the steps of:

providing at least one spring arm on the top hat, the spring arm defining the means for biasing the top hat to the first position with respect to the housing.

34. The method of claim 31 further comprising:

providing stop means on the top hat in the connector means for defining end of travel limits of the top hat between the first position and the second position.

35. The method of claim 34 wherein the step of providing the stop means comprises the steps of:

forming a projection extending from one of the top hat and the connector housing; and forming a recess in the other of the connector housing and the top hat and having opposed ends, the projection sliding between the opposed ends of the recess between the first and second positions of the top hat.

36. A fluid quick connector comprising:

a connector housing having a throughbore configured to mate with an endform;

seal means disposed in the bore for sealing the connector housing to the endform;

a top hat mounted in the bore of the connector housing axially adjacent to the seal means, the top hat movable between a first position indicating a non-fully inserted position of the endform in the connector housing and a second position upon contact with and full insertion of the endform into the housing;

means, monolithically formed on the top hat for biasing the top hat to the first position, the biasing means including a pair of spring arms carried on the top hat;

retainer means, transversely mounted in the housing, for latching the endform in the housing, the retainer means movable from a first non-latching position with respect to the endform to a second latching position only when the endform has moved the top hat to the second position; and means for preventing movement of the retainer means to the second position including a pair of posts, each having an end extending axially beyond the end of the spring arms.

37. A fluid quick connector comprising:

a connector housing having a throughbore configured to mate with endform;

a seal member mounted in the bore adapted to seal the housing to the endform;

a top hat mounted in the bore of the connector housing axially adjacent to the seal member, the top hat movable between a first position indicating a non-fully inserted position of the endform in the connector housing and a second position upon contact with and full insertion of the endform into the housing;

retainer means, transversely mounted in the housing, for latching the endform in the housing, the retainer means movable from a first non-latching position with respect to the endform to a second latching position only when the endform has moved the top hat to the second position;

means for biasing the top hat to the first position, the biasing means including at least one spring arm movable to a position allowing sliding movement of the top hat to the second position in the bore in the housing upon contact with an endform inserted into the bore in the housing; and the top hat including a post having an end extending axially beyond the end of the spring arm.

38. The fluid quick connector of claim 37 wherein the post comprises:

a pair of posts.

* * * * *